Figure 1:
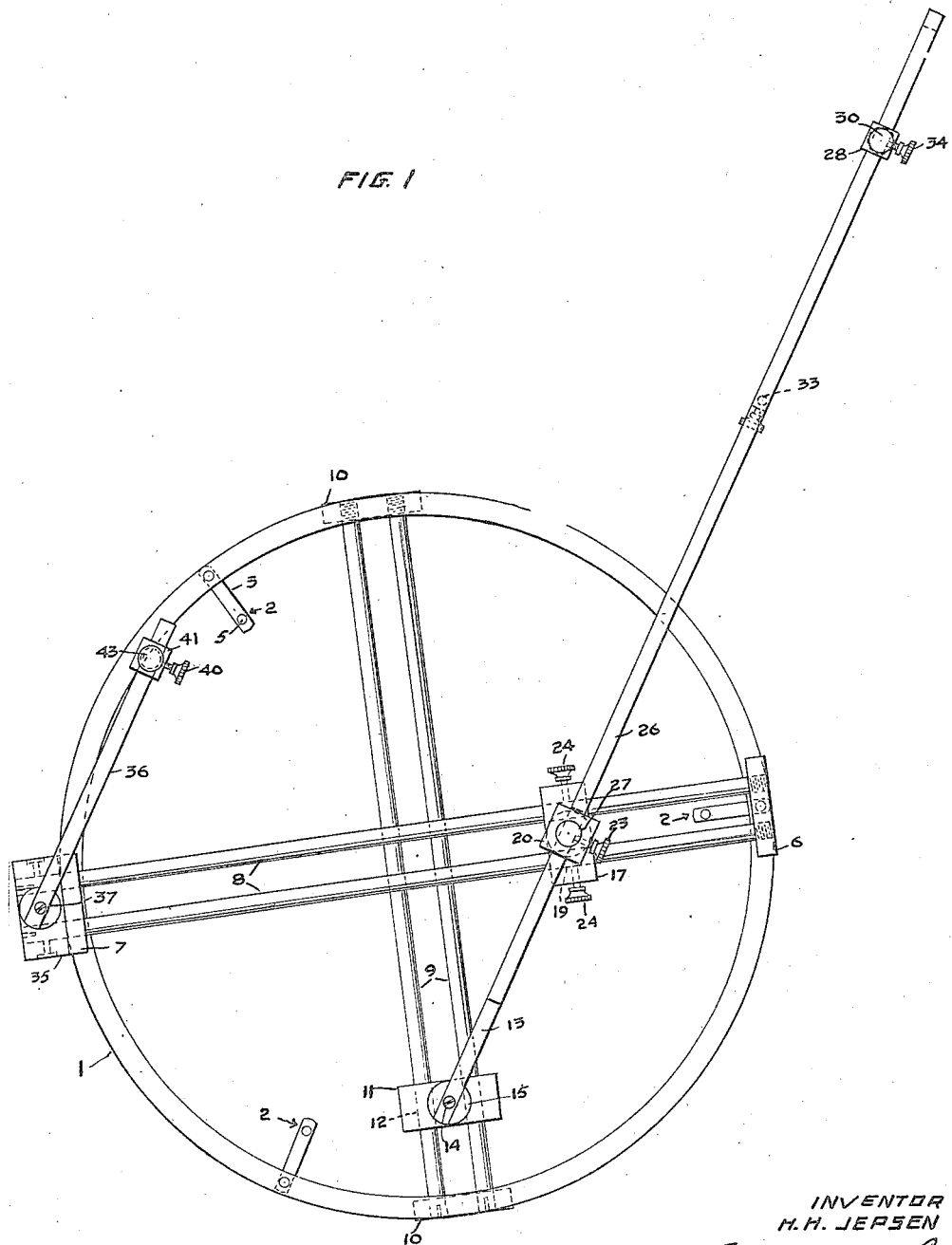

Oct. 9, 1923.

H. H. JEPSEN

SCRIBING INSTRUMENT

Filed Oct. 3, 1921

1,470,168

3 Sheets-Sheet 1

INVENTOR
H.H. JEPSEN
BY
ATT'YS.

Oct. 9, 1923.
H. H. JEPSEN
1,470,168
SCRIBING INSTRUMENT
Filed Oct. 3, 1921
3 Sheets-Sheet 2
FIG. 2
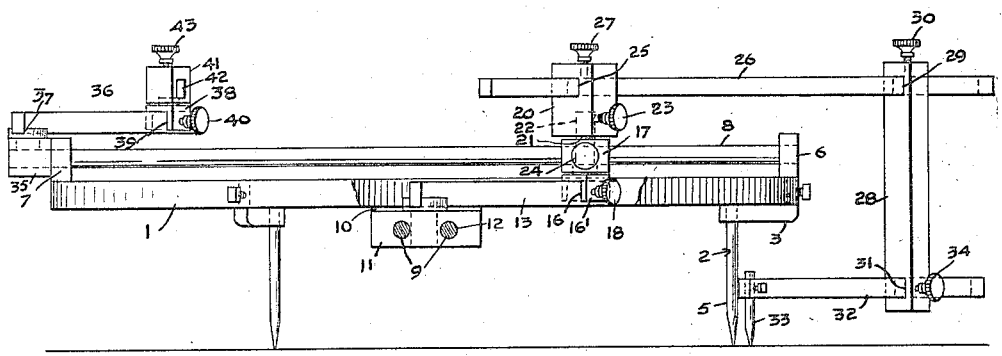
FIG. 3
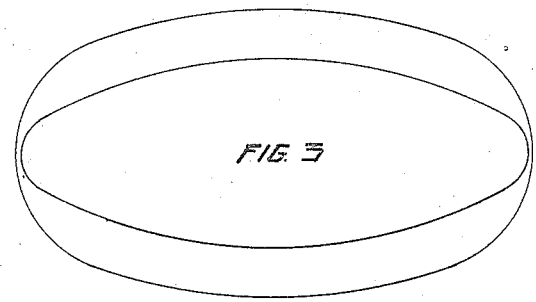
FIG. 4
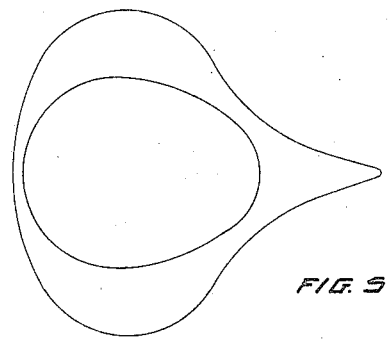
FIG. 5
INVENTOR
H. H. JEPSEN
ATT'YS Oct. 9, 1923.
H. H. JEPSEN
1,470,168
SCRIBING INSTRUMENT
Filed Oct. 3, 1921
3 Sheets-Sheet 3
FIG. 6
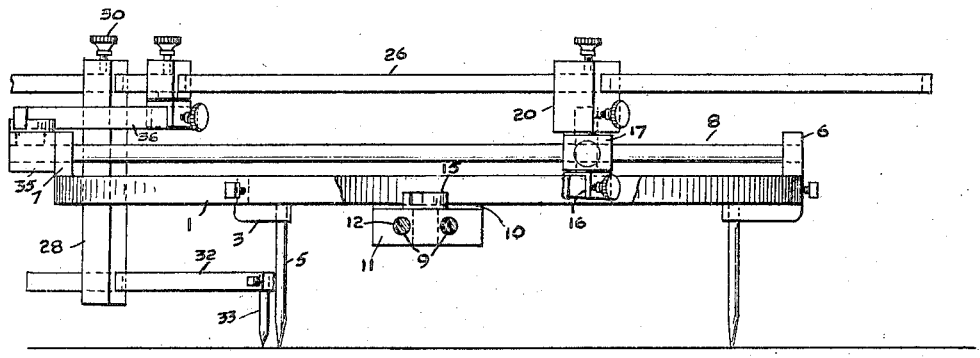
FIG. 7
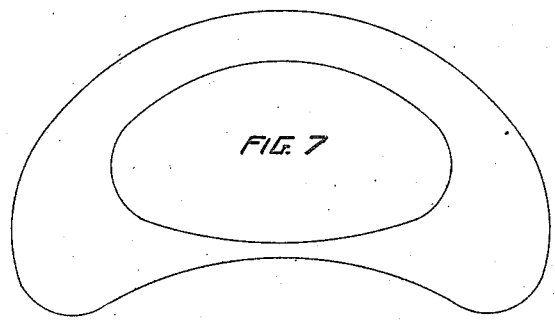
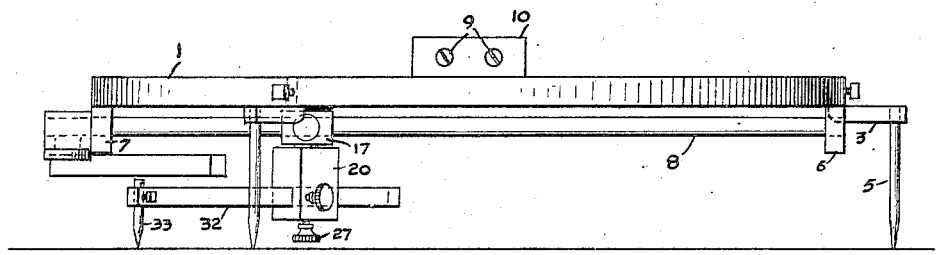
FIG. 8
INVENTOR
H. H. JEPSEN
ATT'YS.

Patented Oct. 9, 1923.

1,470,168

UNITED STATES PATENT OFFICE.

HANS H. JEPSEN, OF SAN FRANCISCO, CALIFORNIA.

SCRIBING INSTRUMENT.

Application filed October 3, 1921. Serial No. 504,966.

*To all whom it may concern:*

Be it known that I, HANS H. JEPSEN, a citizen of the United States, residing at San Francisco, in the county of San Francisco and State of California, have invented new and useful Improvements in Scribing Instruments, of which the following is a specification.

The present invention relates to improvements in scribing instruments and resides in the provision of a comparatively simple instrument by means of which figures of various sizes and shapes may be effectively and accurately drawn.

The primary object of the invention is to provide a scribing instrument of the character described which will permit of the scribing of figures and outlines of such formations and shapes as heretofore have required the use of several different instruments, the said instrument being capable of adjustment and rearrangement in a simple and effective manner to provide for accurately scribing elliptical figures, circles and other irregular figures and may be effectively used in pattern work or in outlining sheet metal forms.

The invention further consists in the novel arrangement, inter-relation, combination and association of a plurality of specially constructed parts which comprise an instrument which will be compact, capable of scribing in places ordinarily inaccessible with instruments heretofore employed, and which will have a greater variety of uses than the ordinary scribing instrument.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 is a top plan view of a scribing instrument in accordance with the present invention, the instrument being arranged for scribing elliptical figures; Fig. 2, is a side elevation of the instrument shown in Fig. 1; Fig. 3, is a diagrammatic view illustrating types of elliptical figures which may be scribed with the instrument arranged as shown in Figs. 1 and 2; Fig. 4, is a side elevation of the instrument adjustably mounted for scribing figures of a different character; Fig. 5, is a diagrammatic view of the types of figures which may be scribed with the device arranged as shown in Fig. 4; Fig. 6, is a side elevation of the instrument as arranged to scribe another form of figure; Fig. 7, is a diagrammatic view of the figures scribed with the device arranged as shown in Fig. 6; Fig. 8, is a side elevation of the instrument reversed and arranged for scribing within the confines of the instrument itself.

Referring to the drawings wherein I have illustrated the preferred embodiment of my invention, 1 designates a frame or body portion which is preferably annular and supported upon a plurality, preferably three, leg devices 2, the leg devices being mounted so as to effectively support the frame without interfering with the movement of the scribing device, which will be later described.

Each of the leg devices comprises a right angular or L shaped member 3, one portion of which is vertically and rotatably mounted in an opening formed in the frame 1. The other portion of the right angular member 3 extends horizontally and adjacent to its outer end supports an upright leg 5. Thus the members 3 may be turned so that the legs 5 will be disposed in inwardly offset relation to the frame or disposed outwardly to one side of the frame, depending upon the scribing operation to be carried out.

Mounted in opposite upstanding members 6 and 7, carried on the upper side of the frame 1, are two spaced parallel rods 8, which extend transversely across the center of the frame. Similar rods 9 are mounted in members 10, which depend from the under side of the frame, in such manner that the rods 8 and 9 extend at right angles to one another with their intersection at the center of the frame. Mounted upon the lower rods 9 is a slide member 11 having openings 12 therethru, in which said rods 9 are received. A bar or link 13 is secured by a screw 14 at one end to a rotatable member 15 which extends upwardly from the slide member 11 and the other end of the bar 13 is received in an open slot 16 extending thru a lower revolvable part 16' of a slide member 17, which member is slidably mounted upon the upper rods 8. The bar 13 is preferably rectangular in cross section and the slot 16 is likewise formed so as to slidably receive the bar 13. A set screw 18 is carried by the part 16' and is adapted to engage the bar 13 to hold the same in adjusted position in the slot 16. The slide member 17 is provided with horizontal openings 19 thru which the bars 8 extend. The slide member 17 supports a member 20 upon its upper side and a pin 21 carried by the lower part 16' extends thru the member 17 into an opening 22 in said member 20. A screw 23 extends laterally into the member 20 and thru the pin 21 and secures the member 20 and part 16' for corresponding rotation. On opposite ends of the slide member 17 there are provided set screws 24 which are adapted to engage the bars 8 so as to hold the slide member in adjusted position when desired.

An opening 25 extends horizontally thru the upper portion of the member 20 and slidably receives a scribing arm 26, which latter extends horizontally for a considerable distance beyond the frame 1. By means of a set screw 27 carried on the upper side of the member 20, the arm 26 may be held in the desired adjusted position. An upright slide member 28 is formed adjacent its upper end with an opening 29 thru which the arm 26 extends. By means of a set screw 30, the slide member 28 may be held in adjusted position. The lower end of the member 28 terminates at a point spaced slightly above the lower ends of the legs 5 and is provided with a transverse opening 31 in which is mounted an arm 32, upon one end of which arm a scribing member 33 is secured. The arm 32 extends horizontally and at right angles to the slide member 28, it being held in adjusted position by means of a set screw 34 on the member 28. The arm 32 may be mounted so as to extend from the member 28, either inwardly towards the frame or outwardly away from the frame. The openings 29 and 31 in the member 28 are preferably of angular form so as correspond to the cross sectional formation of the arms 26 and 32, whereby the said arms are limited to horizontal sliding movement with relation to the member 28. When the device is thus assembled the legs 23 are disposed in inwardly off-set relation to the frame, as shown in Fig. 2, whereby the scribing may be carried out to points somewhat beneath and spaced inwardly from the outer confines of the frame.

With the device arranged as shown in Figs. 1 and 2, the scribing of elliptical figures of various dimensions and sizes may be accurately effected, the arm 26 moving around the frame 1, whereas the slide members 11 and 17 will move at right angles to one another on the bars 8 and 9. By adjusting the bar or link 13 so as to change spacing of the members 17 and 11 from one another, the length of the figures to be scribed may be varied as desired. If the members 17 and 11 are moved to a position, one over the other, a true circle may be scribed and as these members are adjusted away from alinement the length of the ellipse will increase. The adjustment permitted of the arms 26 and 32 and slide member 28 provides for regulating the sizes and shapes of the elliptical figures to be scribed, in an effective and accurate manner.

Mounted upon the ends of the rods 8 adjacent to the upstanding member 7 is a block 35 having an arm 36 rotatably mounted thereon by suitable means, as shown at 37. The arm 36 extends horizontally above the member 7 and rods 8 and supports a slide member 38 having an open groove 39 in its under side, which groove receives said arm. A set screw 40 provides for holding the said member 38 in position on the arm 36. A revolvable member 41 is mounted upon the slide member 38 and is provided with a horizontal opening 42 extending therethru and with a set screw 43, the inner end of which screw is adapted to project into said opening. When it is desired to scribe figures not capable of being scribed with the arrangement of the device as shown in Figs. 1 and 2, and also so that the figures may embody ogee curves in certain instances, the inner end of the arm 26 is extended thru the opening 42 in the member 41, as shown in Fig. 4. The arm 20 is then clamped in place as desired, depending upon the character of the figures to be scribed, by tightening the set screw 43, but is allowed to slide freely thru the member 20, which member 20 is held against movement on the rods 8 by tightening the set screws 24 so as to set the slide 17 on said rods in the selected position. With the device thus arranged, the scribing may be carried out for the forming of figures hereinbefore mentioned, the arm 36 producing an eccentric motion in the travel of the scribing point 33. The link or arm 13 is detached when the above arrangement is effected. It will thus be seen that the arm 13 when removed may take the place of the arm 36 and require the use of only one arm or link instead of two, if so desired, inasmuch as the links 13 and 36 are of the same construction and are removably mounted in place.

Another arrangement providing for the scribing of an entirely different kind of figure or figures is illustrated in Fig. 6 of the drawings, wherein the arm 26 is reversed so that the members 28 and 32 and scribing point 33 are on the opposite side of the frame from that shown in Figs. 1, 2 and 3, the free end of the arm being extended first thru the opening 42 and then thru the opening in the member 20, the arm being then set in the member 41 by a set screw 43 and allowed to move freely in the member 20. The arm 32 may be arranged to extend the scribing point 33 either beneath the frame or laterally outside of the latter, depending upon the scribing to be done and by manipulating the several adjustments, the scribing of a greater variety of figures of different characters than is possible with other arrangements of this device, may be effectively, accurately and easily carried out.

With reference to Fig. 8, it will be seen that the device as a whole, is inverted. This will provide for scribing of elliptical figures beneath or under the frame 1. In arranging the device in this manner, the leg devices 2 are removed, together with the arm 26, and the frame is turned upside down, the right angle members 3 being inverted in the openings 4 in the then, under side, of the said frame, said openings being extended entirely thru the frame. The legs are then preferably, turned so as to be disposed outwardly to one side of the frame and the arm 32 is inserted in the block or member 20, which then depends from the frame. With the arm and scribing point 33 thus arranged, the scribing of small elliptical figures, which otherwise could not be scribed with this device in its normal arrangement, may be effectively carried out.

It will thus be seen that I have provided a comparatively simple, compact and inexpensive instrument which may be used to scribe figures of varying type such as would ordinarily require the employment of several scribing instruments, it only being necessary to make a few simple adjustments and change the arrangement of the parts of the device in order to provide for the use of the device as above noted. The construction of the various elements of the device is such that the said elements may be readily removed and rearranged or adjusted so that an accurate and easy scribing may be carried out in all instances.

The figures 3, 5 and 7 show different kinds of figures which may be scribed with the device of this invention. The ellipsis shown in Fig. 3 and ellipsis of different formation may be scribed with the device arranged as shown in Figs. 1 and 2 and the figures of Fig. 5 illustrate the various forms of scribing which may be effected with the device as shown in Fig. 4.

Fig. 7 exemplifies the kind of scribing which may be effected with the device arranged as shown in Fig. 6. While figures 3, 5 and 7, respectively, illustrate elliptical forms of scribing which may be accomplished, it is to be understood that the invention is not limited to these forms but may be utilized for scribing a variety of entirely different ellipsis and corresponding figures.

I claim:

1. A scribing instrument embodying in its construction an annular frame, guide rods supported by and extending across said frame, slide members movable upon said rods, an arm slidable longitudinally in one of said slide members, a slide member mounted upon said arm and depending therefrom, a scribing point adjustably connected with said last named slide member, and angular legs pivoted on the frame and arranged so as to be disposed in inwardly or outwardly off-set relation to the outer perimeter of the frame.

2. A scribing instrument embodying in its construction a frame, guide rods supported by said frame, slide members movable upon said rods, a bar connected at one end with one slide member and adjustably connected at its other end with the other slide member, a rotary member mounted upon the last named slide member and having an opening therein, an arm movable longitudinally thru said opening, a slide member movable upon said arm, a scribing point adjustably supported upon said last named slide member and legs capable of being mounted upon said frame so as to support the same in normal and inverted positions, with the elements of said instrument spaced above the work when the frame is in either position.

3. A scribing instrument embodying in its construction a frame, a plurality of guide rods extending in different directions upon said frame, a slide member movable upon certain of said rods, a slide member movable upon others of said rods, a member rotatable upon the second named slide member, a scribing arm adjustably supported upon said rotatable member, a scribing point adjustably connected with said arm and a single link pivoted on the first named slide member and secured directly to the rotatable member.

4. A scribing instrument embodying in its construction a frame, a plurality of guide rods extending in different directions upon said frame, a slide member movable upon certain of said rods, a slide member movable upon others of said rods, a member rotatable upon the second named slide member, a scribing arm adjustably supported upon said rotatable member, a scribing point adjustably connected with said arm, a single link pivoted to the first named slide member and secured directly to the rotatable member and means for adjustably securing said link to said rotatable member.

5. A scribing instrument embodying in its construction a frame, guide rods extending in different directions across said frame, arms pivoted upon said frame so as to be extended inwardly towards the center thereof or outwardly away from the outer sides of the frame, supporting legs carried upon the outer extremities of said arms, slide members mounted for sliding movement on said rods, a rotatable member on one of said slide members, a link rigidly secured to said rotatable member and pivoted directly on the other slide member, a scribing point and means for supporting said scribing point and being adjustably connected with said rotatable member.

6. A scribing instrument embodying in its construction a frame, guide members extending in different directions across said frame, slide members movable upon the guides, an arm slidable longitudinally in one of the slide members, a scribing point adjustable upon said arm, attaching means fixed upon said frame, a link pivotally connected with said attaching means and means adjustable on said link for connecting the free end of the link to said arm.

HANS H. JEPSEN.